(12) United States Patent
Shibasaki

(10) Patent No.: US 8,485,671 B2
(45) Date of Patent: *Jul. 16, 2013

(54) PROJECTOR APPARATUS WHICH CONTROLS PULSE WIDTHS OF LIGHT BEAMS EMITTED FROM PULSE-DRIVEN LIGHT SOURCES OF DIFFERENT COLORS BASED ON MEASURED ILLUMINATION VALUES OF THE LIGHT SOURCES

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,600

(22) Filed: Jun. 25, 2012

(65) Prior Publication Data

US 2012/0262678 A1 Oct. 18, 2012

Related U.S. Application Data

(63) Continuation of application No. 12/562,297, filed on Sep. 18, 2009, now Pat. No. 8,210,691.

(30) Foreign Application Priority Data

Sep. 25, 2008 (JP) ................. 2008-245247

(51) Int. Cl.
*G03B 21/20* (2006.01)
*G01J 1/32* (2006.01)

(52) U.S. Cl.
USPC .......................................... 353/85; 250/205

(58) Field of Classification Search
USPC ............. 353/31, 121, 122, 85–87; 250/208.1, 250/205, 214 R, 214.1, 231.1, 226; 345/207, 345/690, 691, 63, 77; 348/655–658, 744, 348/750; 362/611–613, 552, 227, 231, 112, 362/149, 152, 207, 694; 315/10, 149, 155
See application file for complete search history.

(56) References Cited

U.S. PATENT DOCUMENTS 7,052,138 B2 5/2006 Matsui
8,210,691 B2 * 7/2012 Shibasaki ....................... 353/85

(Continued)

FOREIGN PATENT DOCUMENTS

JP 2004-184852 A 7/2004
JP 2004-296841 A 10/2004

(Continued)

OTHER PUBLICATIONS

Korean Office Action dated Jan. 18, 2011, and English translation thereof, issued in counterpart Korean Application No. 10-2009-0090431.

Japanese Office Action dated Aug. 3, 2010, and English translation thereof, issued in counterpart Japanese Application No. 2008-245247.

*Primary Examiner* — Que T Le
*Assistant Examiner* — Jennifer Bennett
(74) *Attorney, Agent, or Firm* — Holtz, Holtz, Goodman & Chick, P.C.

(57) ABSTRACT

A projector apparatus includes a light source configured to emit light beams of a plurality of color components, emissions of the light beams being controlled individually, a projection unit configured to form images respectively corresponding to the color components using the light beams from the light source for each frame and to sequentially project the images, a driving unit configured to drive the light source so that the light beams are emitted as light pulses having respectively predetermined pulse widths for a period in which the projection unit projects each of the images, a detector configured to detect deterioration levels of the light source respectively for the color components, and a controller configured to control the pulse widths of the light beams emitted from the light source based on the deterioration levels.

10 Claims, 5 Drawing Sheets

U.S. PATENT DOCUMENTS

| | | |
|---|---|---|
| 2006/0170883 A1 | 8/2006 | Matsui |
| 2006/0186826 A1* | 8/2006 | Miyazawa ................. 315/169.4 |
| 2006/0192899 A1* | 8/2006 | Ogita ........................... 348/744 |
| 2006/0227085 A1 | 10/2006 | Boldt, Jr. et al. |
| 2007/0132706 A1 | 6/2007 | Nishimura et al. |
| 2008/0158441 A1 | 7/2008 | Yamamuro et al. |

FOREIGN PATENT DOCUMENTS

| | | |
|---|---|---|
| JP | 2004-317558 A | 11/2004 |
| JP | 2007-065012 A | 3/2007 |
| JP | 2007-171364 A | 7/2007 |
| JP | 2008-177049 A | 7/2008 |

* cited by examiner

FIG.3

| | ILLUMINATION VALUE | | | PULSE WIDTH CONTROL INFORMATION PT | | |
|---|---|---|---|---|---|---|
| | R ILLUMINATION VALUE < PREDETERMINED VALUE | G ILLUMINATION VALUE < PREDETERMINED VALUE | B ILLUMINATION VALUE < PREDETERMINED VALUE | R FULL EMISSION | G FULL EMISSION | B FULL EMISSION |
| (1) | NO | NO | NO | NO CHANGE | NO CHANGE | NO CHANGE |
| (2) | NO | NO | YES | NARROW R AND G PULSE WIDTHS | NARROW R AND G PULSE WIDTHS | NARROW R AND G PULSE WIDTHS |
| (3) | NO | YES | NO | NARROW R AND B PULSE WIDTHS | NARROW R AND B PULSE WIDTHS | NARROW R AND B PULSE WIDTHS |
| (4) | NO | YES | YES | NARROW R PULSE WIDTH | NARROW R PULSE WIDTH | NARROW R PULSE WIDTH |
| (5) | YES | NO | NO | NARROW G AND B PULSE WIDTHS | NARROW G AND B PULSE WIDTHS | NARROW G AND B PULSE WIDTHS |
| (6) | YES | NO | YES | NARROW G PULSE WIDTH | NARROW G PULSE WIDTH | NARROW G PULSE WIDTH |
| (7) | YES | YES | NO | NARROW B PULSE WIDTH | NARROW B PULSE WIDTH | NARROW B PULSE WIDTH |
| (8) | YES | YES | YES | NO CHANGE | NO CHANGE | NO CHANGE |

PROJECTOR APPARATUS WHICH CONTROLS PULSE WIDTHS OF LIGHT BEAMS EMITTED FROM PULSE-DRIVEN LIGHT SOURCES OF DIFFERENT COLORS BASED ON MEASURED ILLUMINATION VALUES OF THE LIGHT SOURCES

CROSS-REFERENCE TO RELATED APPLICATIONS

This application is a Continuation of U.S. application Ser. No. 12/562,297, filed Sep. 18, 2009 now U.S. Pat. No. 8,210, 691, which is based upon and claims the benefit of priority from prior Japanese Patent Application No. 2008-245247, filed Sep. 25, 2008, the entire contents of both of which are incorporated herein by reference.

BACKGROUND OF THE INVENTION

1. Field of the Invention

The present invention relates to a projector apparatus, a control program for the projector apparatus and a light source controlling method for the projector apparatus. The projector apparatus uses light sources which emit light beams of different colors to project an image.

2. Description of the Related Art

Conventionally, a projector apparatus having a halogen lamp light source has been used in general. In recent years, a projector apparatus which employs, as light sources, three LEDs respectively emitting red, green and blue light beams has been proposed to downsize the apparatus and to make the apparatus portable. However, the projector apparatus which uses the three LEDs cannot project an image with a higher luminance. This is because the LEDs emit light beams by turns, and in each moment, only one of the red, green and blue LEDs is emitting a light beam. In addition, luminance of an LED is lower than that of a halogen lamp.

Jpn. Pat, Appln KOKAI Publication No. 2004-317558 discloses a projector which can project an image with a higher luminance. According to the projector, when a light beam of one color is emitted from an LED, the other LEDs are driven by low power to emit light beams. For example, while an LED is emitting a red light beam, the other LEDs are driven by low power and emit green and blue light beams. Thus, an image can be projected with a higher luminance.

However, an LED has characteristics that a color of the emitted light beam varies with a value of the drive current when the driving current is lower than the rated current for the LED. That is, when an LED is driven by low drive current to emit a light beam, the color of the light beam differs from the original emission color of the LED.

Therefore, when the red LED emits the red light beam and the green and blue LEDS are driven by the low power to emit the green and blue light beams, a total emission color from the projector differs from a combination of a large amount of red, a little amount of green and a little blue. The total emission color includes colors which are varied from green and blue due to the low power driving in addition to red and presents an unexpected color.

Moreover, an LED deteriorates as the LED is used longer (as emitting time becomes longer). Therefore, with the deterioration, the luminance of the LED is decreased and chromaticity may also be varied. Thus, the above projector, in which while one LED (red, for example) is emitting a light beam, the other LEDs (green and blue) are also driven, deteriorates more quickly than a projector in which only one of the LEDs emits a light beam at a time. As a result, the total emission color of the projector may include colors which are varied from green and blue due to the deterioration in addition to red and presents an unexpected color.

Therefore, according to Jpn. Pat. Appln. KOKAI Publication No. 2004-317558, although an image can be projected with a higher luminance, chromaticity adjustment for the projected image is impossible.

BRIEF SUMMARY OF THE INVENTION

It is an object of the present invention to provide a projector apparatus, a control program for the projector apparatus and a light source controlling method for the projector apparatus which can project an image with a higher luminance and adjust chromaticity of the image.

According to an embodiment of the present invention, a projector apparatus comprises:

a light source configured to emit light beams of a plurality of color components, emissions of the light beams controlled individually;

a projection unit configured to form images respectively corresponding to the color components using the light beams from the light source for each frame and to sequentially project the images;

a driving unit configured to drive the light source so that the light beams are emitted as light pulses having respectively predetermined pulse widths for a period in which the projection unit projects each of the images;

a detector configured to detect deterioration levels of the light source respectively for the color components; and a controller configured to control the pulse widths of the light beams emitted from the light source based on the deterioration levels.

According to another embodiment of the present invention, a control program for use with a projector apparatus comprising a light source configured to emit light beams of a plurality of color components, emissions of the light beams controlled individually, the control program comprises;

first computer readable program means for forming images respectively corresponding to the color components using the light beams from the light source for each frame and sequentially projecting the images;

second computer readable program means for driving the light source so that the light beams are emitted as light pulses having respectively predetermined pulse widths for a period in which each of the images are projected;

third computer readable program means for detecting deterioration levels of the light source respectively for the color components; and forth computer readable program means for controlling the pulse widths of the light beams emitted from the light source based on the deterioration levels.

According to another embodiment of the present invention, a control method for a projector apparatus comprising a light source configured to emit light beams of a plurality of color components, emissions of the light beams controlled individually, the method comprises:

forming images respectively corresponding to the color components using the light beams from the light source for each frame and sequentially projecting the images;

driving the light source so that the light beams are emitted as light pulses having respectively predetermined pulse widths for a period in which each of the images is projected;

detecting deterioration levels of the light source respectively for the color components; and controlling the pulse widths of the light beams emitted from the light source based on the deterioration levels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 shows schematically a pulse-width control table according to the embodiment;

DETAILED DESCRIPTION OF THE INVENTION

Figure 1:
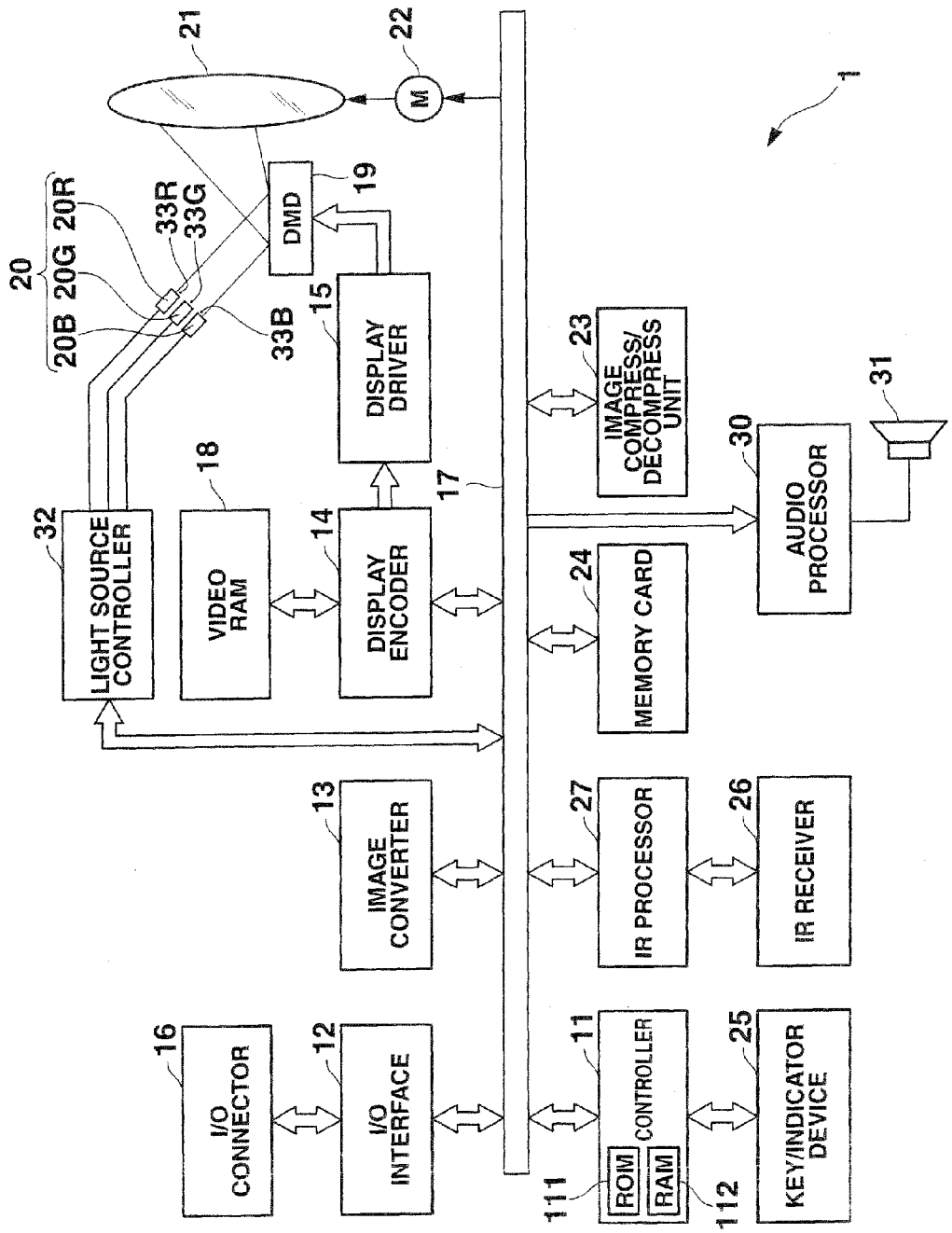
FIG. 1 is a block diagram showing a circuit configuration of a projector apparatus according to an embodiment of the present invention.

Hereinafter, an embodiment of the present invention will be described with reference to the accompanying drawings. Some limitations may be set on the embodiment for a technical reason; however, a scope of the invention will not be limited to the embodiment and the drawings described hereinafter.

An explanation will be given on one embodiment of the invention referring to the drawings.

FIG. 1 is a block diagram showing an electronic configuration of a projector apparatus 1 according to an embodiment. The projector apparatus 1 includes a controller 11, an input-output (I/O) interface 12, an image converter 13, a display encoder 14, and a display driver 15. In addition, the projector apparatus 1 includes input-output (I/O) connector unit 16 and a system bus 17. An image signal (or image data) complying with one of the various standards is input to the I/O connector unit 16, and the image signal is sent to the image converter 13 via the I/O interface 12 and the system bus 17. The image converter 13 converts the image signal into a predetermined format which is appropriate to be displayed and the converted image signal is sent to the display encoder 14.

The display encoder 14 extracts the image signal and stores the image signal in a video RAM 18. The display encoder 14 generates a video signal from the data stored in the video RAM 18 and outputs the generated video signal to the display driver 15.

The display driver 15 receives the video signal from the display encoder 14 and drives a digital micromirror device (DMD) 19, which functions as a display element, based on the video signal at an appropriate frame rate to achieve resolution of 256 gradations. A light-source optical system includes a light source unit 20. Light beams emitted from the light source unit 20 strike the DMD 19 and are reflected by the DMD 19 to form an optical image. The optical image is projected on a screen (not shown) through movable lenses 21 of a projection optical system. The lens motor 22 drives the lenses 21 to adjust focusing and zooming.

An image compress/decompress unit 23 performs adaptive discrete cosine transformation (ADCT) and Huffman coding processing on a luminance signal and a color difference signal in the image signal to compress the image data. The compressed image data is written into a memory card 24 or a removable storage medium. Moreover, the image compress/decompress unit 23 reads out the image data stored in the memory card 24 and decompresses or expands items of the image data, which collectively form a moving image, in units of frame. The expanded image data are sent to the display encoder 14 via the image converter 13. Thus, images such as a moving image can be displayed based on the image data stored in the memory card 24.

The controller 11 includes a CPU (not shown), peripheral circuitry of the CPU, a ROM 111 and a RAM 112. The controller 11 controls operations of units in the projector apparatus 1. The ROM 111 prestores programs for various settings in the projector apparatus 1, a program represented by a flowchart to be described below, and various data which the CPU utilizes. The RAM 112 functions as a work memory.

A key/indicator device 25 includes a main key and indicators provided, for example, on a main body (not shown) of the projector apparatus 1. An operation signal generated by the key/indicator device 25 is transmitted to the controller 11. An infrared (Ir) receiver 26 receives a key operation signal sent from a remote controller (not shown). An infrared (Ir) processor 27 demodulates the received key operation signal and sends the demodulated signal as a code signal to the controller 11.

The system bus 17 connects the controller 11 with an audio processor 30. The audio processor 30 includes an audio source circuit such as a PCM audio source. The audio processor 30 converts audio data into an analog signal and drives a speaker 31 to output the audio signal when a projection mode or a reproduction mode is set.

The light source unit 20 includes a red-color LED 20R which emits red light, a green-color LED 20G which emits green light and a blue-color LED 20B which emits blue light. The controller 11 controls a light source controller 32 based on an image signal to cause the LEDs 20R, 20G and 20B to emit light time-divisionally and to be pulse-driven.

Illuminance sensors 33R, 33G and 33B are provided near the corresponding red-color LED 20R, green-color LED 20G, and blue-color LED 20B. The illuminance sensors 33R, 33G and 33B detect illuminance of the corresponding LEDs 20R, 20G and 20B. The detected illuminance values of the LEDs 20R, 20G and 20B are supplied to the controller 11 via a transfer circuit (not shown).

Figure 2:
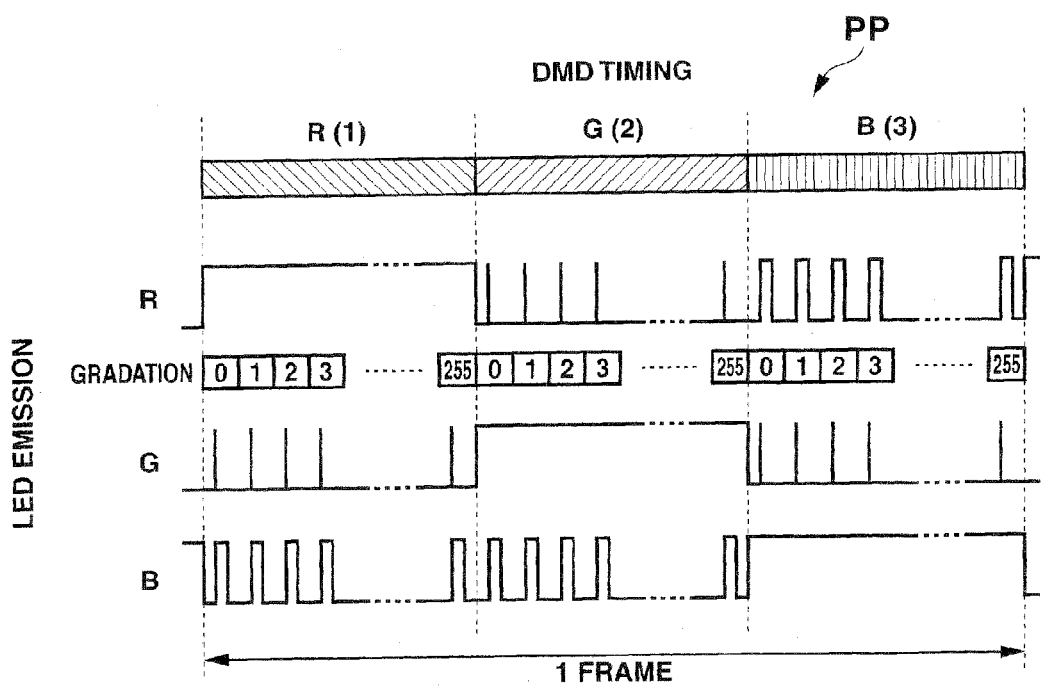
FIG. 2 is a schematic view showing an example of an initial emission pattern for LEDs according to the embodiment.

The ROM 111 stores an initial emission pattern PP illustrated in FIG. 2, which shows initial pulse widths contained in one frame. In normal driving, full-emissions of the LEDs 20R, 20G and 20B divide one frame equally (time-division emission). Hereinafter, "full-emission" or "time-division emission" of an LED will mean that the LED emits a light beam pulse having a width which matches a given period of time (one third of one frame in FIG. 2) to divides the one frame. The pattern PP also includes pulse-emission widths other than the time-division emission pulse width. When one LED is in the time-division emission, the other LEDs emit light beam pulses at certain intervals. In the pattern PP shown in FIG. 2, time-division emissions of the LEDs 20R, 20G and 20B divide equally the frame; however, the embodiment is not so limited. For example, the time-division emission pulse width of the LED 20G may be longer than time-division emission pulse widths of the other LEDs to emit light with a higher luminance.

The more frequently an LED is pulse-driven to emit a light beam, the more appropriate chromaticity can be provided when the DMD forms the projection image. In the present embodiment, an LED is pulse-driven 256 times per given period in correspondence with the 256 (0-255) gradations.

As an LED emits a light beam more frequently and with shorter pulse width to make a light amount a predetermined value, the chromaticity can be balanced more appropriately. Furthermore, the display element of the present embodiment, the DMD 19, forms an image reflecting the light coming from the light source unit 20 to present resolution of 256 gradations. Therefore, pulse-driving of the LEDs synchronized with the reflection by the DMD 19 (256 gradations) allows chromaticity of color combination resulting from the emissions of the LEDs being appropriately balanced.

Therefore, according to the initial emission pattern PP, while the LED 20R is in time-division emission, the LEDs 20G and 20B are pulse-driven to emit pulsed light beams for 256 gradations. As shown in FIG. 2, the pulse width of the LED 20G emission is narrower than the pulse width of the LED 20B emission, in the present embodiment.

Similarly, while the LED 20G is in time-division emission, the LEDs 20R and 20B are pulse-driven to emit pulsed light beams for 256 gradations. The pulse width of the LED 20R emission is narrower than the pulse width of the LED 20B emission as shown in FIG. 2.

While the LED 20B is in time-division emission, the LEDs 20R and 20G are pulse-driven to emit pulsed light beams for 256 gradations. The pulse width of the LED 20R emission is wider than the pulse width of the LED 20G emission in FIG. 2.

The pulse width of the LED 20G for the case when the LED 20R or 20B is in time-division emission is narrower than the pulse width of the LED 20B for the case when the LED 20P or 20G is in time-division emission.

The pulse width of the LED 20R for the case when the LED 20G is in the time-division emission is narrower than the pulse width for the case when the LED 20B is in time-division emission. The pulse width of the LED 20R for the case when the LED 20O is in the time-division emission may be equal to the pulse width of the LED 20G for the case when the LED 20R or 20B is in the time-division emission. The pulse width of the LED 20R for the case when the LED 20G is in time-division emission may be equal to the pulse width of the LED 20G for the case when the LED 20R or 20B is in time-division emission.

The pulse widths shown in the initial pattern PP are determined to increase luminance to some extent and to hardly affect chromaticity.

The ROM 111 stores pulse-width control table PT shown in FIG. 3. The control table PT stores pulse-width controlling information which is set depending on conditions. The conditions can be designated depending on whether "R illuminance" is smaller than a predetermined illuminance value (YES) or not (NO), whether "G illuminance" is smaller than the predetermined illuminance value (YES) or not (NO), and whether "B illuminance" is smaller than the predetermined illuminance value (YES) or not (NO). The control table PT stores pulse width control information ("no change" and "narrow pulse width") for the LEDs 20R, 20G and 20B in association with the respective conditions for each of the "R full-emission", "G full-emission" and "B full-emission". When the "R full-emission" is set, the LED 20R is in time-division emission. When the "G full-emission" is set, the LED 20G is in time-division emission. Further, when the "B full-emission" is set, the LED 20B is in time-division emission.

As shown in FIG. 3, in the condition (1) where all the illuminance values of R, G and B are equal to or larger than the predetermined illuminance value (NO for all colors) and in condition (8) where all illuminance values of R, G and B are smaller than the predetermined illuminance value (YES for all colors), pulse widths are not changed when even any of "R full-emission", "G full-emission" and "B full-emission" is set. Adjustment of the entire chromaticity in one frame is required when deterioration is generated in one or two of the three LEDs. Thus, in the condition (1) or (8), since variations in the illuminance values are small enough or within tolerance, it is not required to adjust entire chromaticity. However, in condition (2) where the illuminance value of the LED 20B is smaller than the predetermined illuminance value, pulse widths of the LEDs 20R and 20G other than the LED 20B are narrowed. That is, according to the control table PT, when illuminance of one or two of the LEDs become smaller than the predetermined illuminance value, pulse width(s) of the other LED(s) having illuminance value(s) equal to or larger than the predetermined illuminance value is narrowed. Accordingly, entire chromaticity in one frame can be adjusted.

Figure 4:
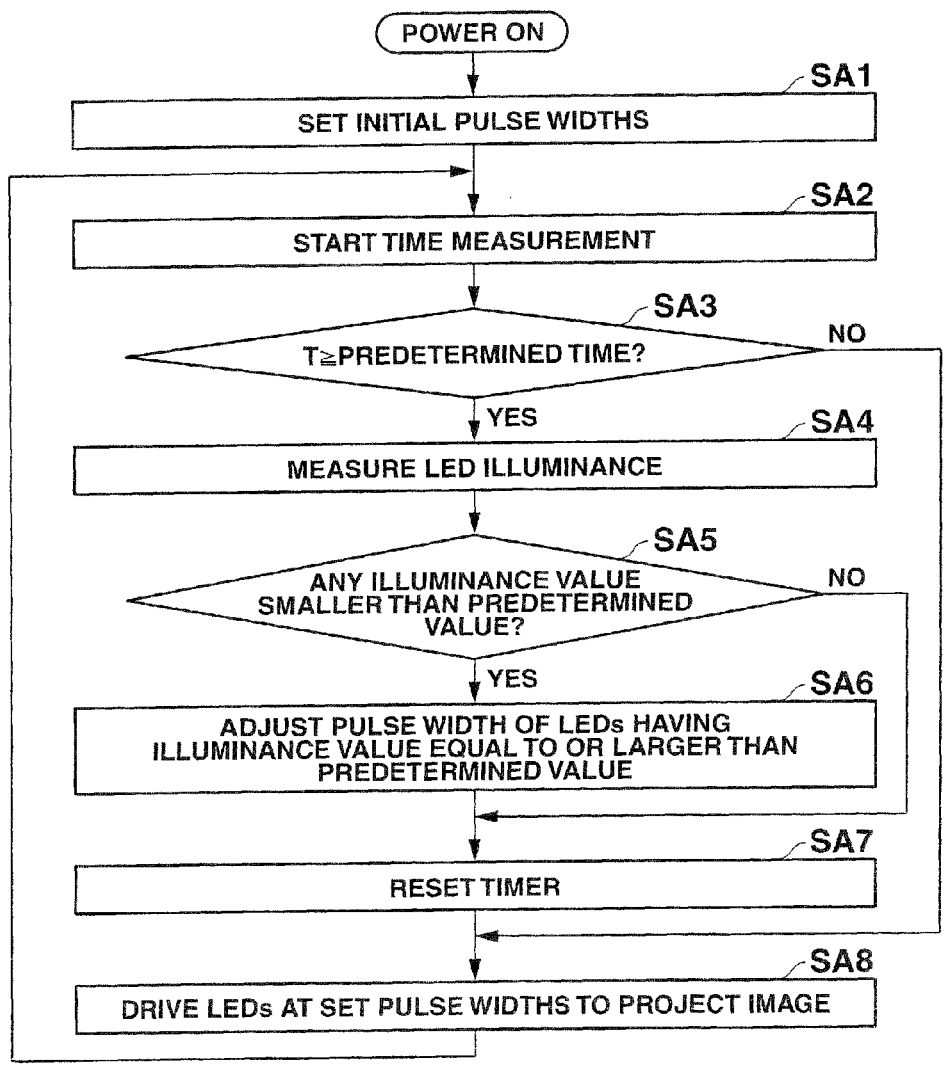
FIG. 4 is a flowchart of pulse emissions according to the embodiment.

By means of the above-described configuration, the controller 11 of the projector apparatus 1 executes the processing expressed in the flowchart shown in FIG. 4 based on a program stored in the ROM 111 at given intervals.

The controller 11 reads the initial emission pattern PP from the ROM 111 and sets the read initial pulse widths contained in the initial emission pattern PP to a given area in the RAM 112 (step SA1). The controller 11 starts time measurement with a timer T which is provided in the controller 11 (step SA2).

The controller 11 determines whether or not the time measured by the timer T arrives at or exceeds a predetermined time (step SA3). When the time measured by the timer T is shorter than the predetermined time (No in step SA3), the flow goes to step SA8 without executing steps SA4 to SA7. The controller 11 causes pulse-driving of the LEDs 20R, 20G and 20B based on pulse widths which are already set and projects an image (step SA8).

If processing of step SA6 has not been executed (if none of the LEDs has deteriorated), the LEDs are driven in step SA8 based on the initial pulse widths set in step SA1. The initial emission pattern PP which presents the initial pulse widths can provide enough luminance for the image and achieve 256 gradations in order not to affect the chromaticity.

Consequently, when the LEDs have not deteriorated and the processing of step SA6 has not been executed, the initial emission pattern PP provides the projected image with higher luminance. In addition, pulsed emissions of the LEDs 20R, 20G and 20B based on the initial emission pattern PP do not cause change in the chromaticity due to change in the currents. Therefore, the pulsed emissions of the LEDs 20R, 20G and 20B based on the initial emission pattern PP do not cause change in the total chromaticity in one frame and present an appropriate projection image.

In addition, the pulse widths in the initial emission pattern PP are defined not to make chromaticity change and to obtain appropriate light amount.

When it is determined that the time measured by the timer T arrives at or exceeds the predetermined time (Yes in step SA3), the controller 11 drives the illuminance sensors 33R, 33G and 33B to measure illuminance values of the LEDs 22R, 22G and 222 (step SA4). The controller 11 determines whether or not any of the measured illuminance values of the LEDs 22R, 22G and 22B is smaller than the predetermined illuminance value (step SA5).

If an LED is used longer, the LED deteriorates and the deterioration decreases an illuminance (luminance) value of the LED. In the present embodiment, total emission periods of the LEDs are not equal in one frame, as shown in the initial emission pattern PP of FIG. 2. Specifically, the total emission period of the LED 20B is the longest and the total emission period of the LED 20G is the shortest. This difference in the total emission periods generates difference in the illuminance values of the LEDs 20R, 20G and 20B. If the projector apparatus 1 is used much longer, the difference in the illuminance values grows significantly larger. As a result, the illuminance values of the LEDs 20R, 20G and 20B may be decreased below the predetermined illuminance value.

When an illuminance value of any of the LEDs is decreased below the predetermined illuminance value (Yes in step SA5), pulse widths of the other LEDs, which have illumination values equal to or larger than the predetermined illuminance value, are adjusted based on the condition of the illuminance values (step SA6). The adjustment in step SA6 is executed based on the pulse-width control table PT shown in FIG. 3.

Thus, adjustment of the pulse widths can be performed with simple processing by referring to the control table PT which is previously stored.

For example, as the LEDs keep emitting light beams having the pulse widths shown in FIG. 2 and the LED 20B is used most frequently, the illuminance value of the LED 20B may be decreased below the predetermined illuminance value as denoted by condition (2) in FIG. 3. In such a case the determination result in step SA5 becomes "Yes", and the pulse widths of the LEDs 20R and 20G are set narrower in step SA6. Alternatively, when the illuminance values of the LED 20G and 20B are decreased below the predetermined illuminance value as denoted by condition (4) in FIG. 3, the pulse width of the LED 20R that is other than the LEDs 20G and 20B is narrowed.

The controller 11 narrows a pulse width of an LED keeping an illuminance value equal to or larger than the predetermined illuminance value without deterioration. By reducing the illuminance value of the LED keeping enough illuminance, the illuminance values of the LEDs are balanced. As a result, the total chromaticity of the projection light emitted from the LEDs 20R, 20G and 201 can be prevented from having unexpected chromaticity.

Then, the controller 11 resets the timer T (step SA7) and executes step SA8. In step SA8, as described, the LEDs 20R, 20G and 20B are driven to emit light beams at the pulse widths set in step SA6.

As described above, pulse emissions of the LEDs at the pulse widths initially set in step SA1 increase illuminance in normal driving. The emission is controlled merely by switching on/off of the LEDs and it is not required to change currents applied to the LEDs. Therefore, chromaticity change is not generated by the change in the currents. When an illuminance value of any of the LEDs is decreased below the predetermined illuminance value, the pulse widths of the other LEDs having luminance values equal to or larger than the predetermined illuminance value are adjusted to be narrowed without changing the currents applied to the LEDs. Therefore, unexpected chromaticity change is not generated by the change in the currents.

In the projector apparatus 1 according to the present embodiment, chromaticity of the projected image is adjusted easily, since unexpected color change in the emission colors of the LEDs 20R, 20G and 20B due to the change in the currents is not generated. Therefore, when the illuminance values of the LEDs are reduced, high luminance can be provided for the projected image avoiding complicated chromaticity adjustment.

In the present embodiment, the processing of step SA4 is executed every predetermined period T. Therefore, measurement of the illuminance values of the LEDs can be performed timely. In the above embodiment, it is assumed that decrease in an illuminance value of an LED is brought about mainly by deterioration in the LED. However, in actuality, variation in the illuminance value may be produced due to environmental temperature and individual difference of the LED. In the present embodiment, to address such variation in the illuminance, the actual luminance values of the LEDs are periodically measured by the illuminance sensors and it is checked whether an illuminance value of any of the LEDs becomes lower than the predetermined illuminance value. Thus, the variation in the luminance value of the LED resulting from various factors can be detected properly.

The time interval T at which the illuminance sensors 33R, 33G and 33B measure the illuminance values of the LEDs in step SA4 may be defined based on when the LEDs are mounted, the initial pulse widths of the LEDs, or usage environment of the projector apparatus 1.

In the present embodiment, the processing of step SA4 is executed at given intervals T; however, the invention is not so limited. The processing may be executed automatically at the time of starting up the projector apparatus 1, or may be executed in response to an instruction made by the user.

The projector apparatus 1 of the present embodiment includes three illumination sensors 33R, 33G and 33B in accordance with the three LEDs 20R, 20G and 20B. However, such configuration is possible that a single illumination sensor is provided and the illumination sensor measures the illuminance values of the LEDs 20R, 20G and 20B in synchronism with time-division emissions of the LEDs.

In the projector apparatus 1 of the present embodiment, the illuminance sensors are provided near the corresponding LEDs and directly measure the light beams emitted from the LEDs. However, the illuminance sensors may measure light reflected by the DMD 19 as unnecessary light which will not be used to form a projection image. According to the projector apparatus 1 described herein, regardless of arrangement of the illumination sensors, proper illumination values of the LEDs can be measured in the case where the illumination values are decreased due to external factors as well as the aged deterioration of the LEDs.

Figure 5:
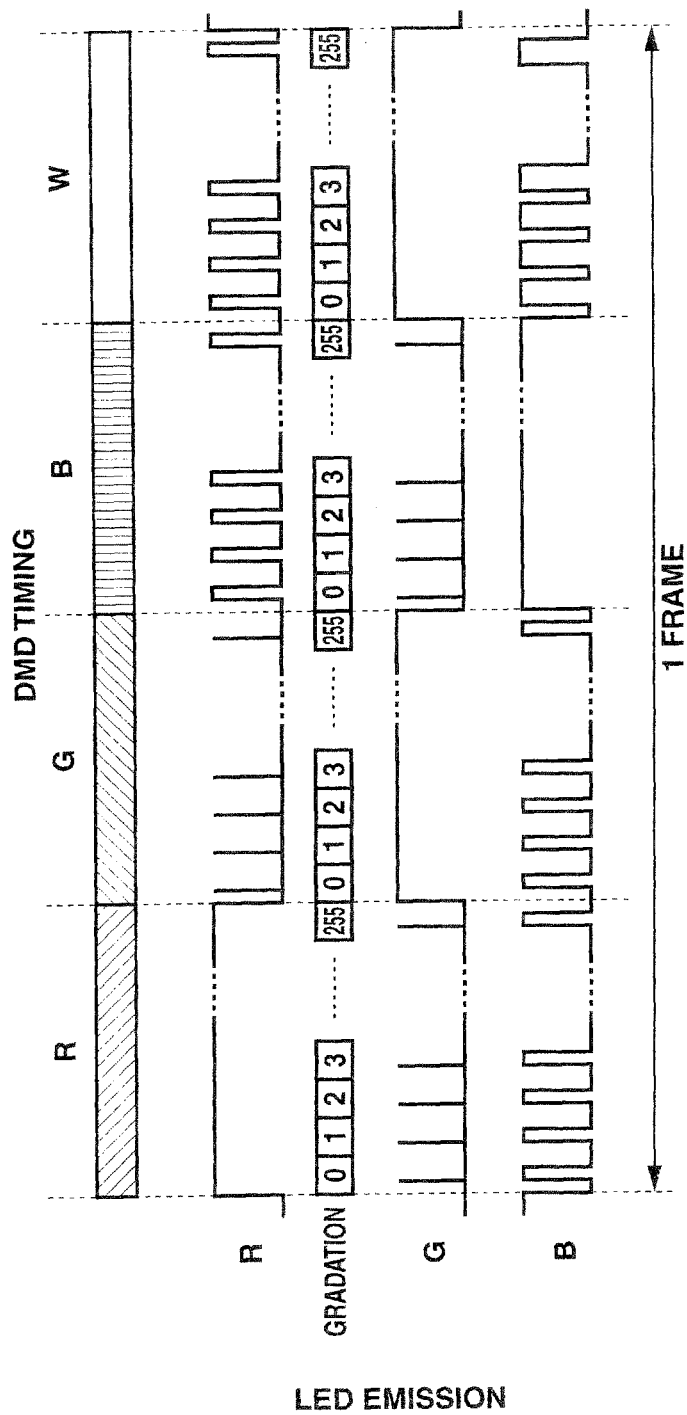
FIG. 5 is schematic view showing an example of a pulse-width pattern of emissions in the case where a frame is divided into four.

In the projection apparatus 1 of the present embodiment, the time-division emissions of the LEDs 20R, 20G and 20B divide one frame into three periods. However, as shown in FIG. 5, one frame may be divided into four periods. In this case, fourth period of divided frame is assigned to white light emission. In the period of the white light emission, the LEDs 20R, 20G and 20B are pulse-driven for 256 gradations at pulse widths preliminary defined as initial values. When an illumination value of any of the LEDs becomes lower than the predetermined illumination value, the pulse widths of the other LEDs keeping illumination values equal to or larger than the predetermined illumination value are adjusted to be narrowed based on the control table PT shown in FIG. 3.

In the white light emission period, if no LED presents a lower illumination value than the predetermined illumination value, the highest luminance can be derived by causing the LEDs 20R, 20G and 20B fully emitted without chromaticity change. On the other hand, the chromaticity of the white light can be adjusted arbitrary by pulse-driving the LEDs.

In the present embodiment, the LEDs are pulse-driven to emit 256 light pulses per period. However, the LEDs may be pulse-driven more frequently, or alternatively, the pulse-emission frequency may be lowered. In any case, each LED is set to emit light pulses at constant intervals in an emission period. By changes pulse widths of the LEDs, the chromaticity can be adjusted. Since the currents to be applied to the LEDs are not changed, the chromaticity change cannot be generated.

According to the present embodiment, the initial emission pattern PP includes the pulse widths which hardly affect the entire chromaticity in one frame; however, the invention is not so limited. For example, the projector apparatus 1 may be configured to have a plurality of operating modes including a luminance preceding mode, a normal operating mode, and a chromaticity preceding mode, which are settable based on an arbitrary selection made by the user. The pulse widths may be set longer, normally or shorter in the luminance preceding mode, normal operating mode, or the chromaticity preceding mode.

In the present embodiment, when an illuminance value of an LED becomes smaller than the predetermined illuminance value, the processing of step SA6 is executed. When illuminance values of more than one LED are below the predetermined illuminance value as denoted by conditions (4), (6), (7) and (8) in FIG. 3, the smallest illuminance value may be made as a reference value, and pulse widths of the other LEDs may be narrowed to present the reference value. Thus, the chromaticity can be adjusted more precisely.

The projector apparatus 1 of the present embodiment utilizes the LEDs having different emission colors as light sources. However, other light sources having different emission colors such laser light sources may be utilized.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can also be implemented as a computer readable recording medium in which a program for allowing a computer to execute predetermined means, allowing the computer to function as predetermined means, or allowing the computer to realize a predetermined function is recorded.

What is claimed is:

1. A projector apparatus comprising: a group of light sources source configured to emit light beams of a plurality of color components; a projection unit configured to project an image using the light beams from the group of light sources; a driving unit configured to drive the group of light sources so that the light beams are emitted as light pulses having respective pulse widths for a period in which the projection unit projects the image; a controller configured to control the pulse widths of the light pulses emitted from the group of light sources; and measuring unit configured to measure illumination values of the group of light sources for each of the plurality of color components, wherein the controller is configured to determine whether the illumination value for each of the plurality of color components is smaller than a predetermined value; and wherein the controller is configured to narrow the pulse width of a light pulse of a light source in the group of light sources that is determined to have an illumination value that is not smaller than the predetermined value if it is determined that an illumination value of another light source in the group of light sources is smaller than the predetermined value.

2. The projector apparatus according to claim 1, wherein the group of light sources comprises light-emitting diodes configured to emit light of red, green, and blue.

3. The projector apparatus according to claim 1, wherein the controller comprises a storage unit configured to store control information for the pulse widths for each of the plurality of color components.

4. The projector apparatus according to claim 1, wherein the controller is configured to control the pulse widths so that a total chromaticity of the light beams of the plurality of color components is balanced in one frame.

5. The projector apparatus according to claim 1, wherein the driving unit is configured to pulse-drive the group of light sources to present a predetermined number of gradations of colors.

6. The projector apparatus according to claim 5, further comprising a display unit configured to form an optical image in gradations using the light beams of the plurality of color components, wherein the display unit is configured to reproduce the predetermined number of gradations of colors at a maximum.

7. The projector apparatus according to claim 1, wherein the controller is configured to narrow the pulse width of a light pulse of a light source other than a light source having a minimum illumination value if it is determined that the illumination values of all the group of light sources are smaller than the predetermined value.

8. The projector apparatus according to claim 1, wherein the controller is configured to narrow the pulse width of a light pulse of a light source having an illumination value that is not smaller than the predetermined value so that a total chromaticity of the light beams of the plurality of color components is balanced in one frame.

9. A non-transitory computer-readable storage medium having a program stored thereon for use with a projector apparatus comprising a group of light sources configured to emit light beams of a plurality of color components, and a projection unit configured to project an image using the light beams from the group of light sources, the program controlling a computer of the projector apparatus to perform functions comprising: driving the group of light sources so that the light beams are emitted as light pulses having respective pulse widths for a period in which the projection unit projects the image; controlling the pulse widths of the light pulses emitted from the group of light sources; and measuring illumination values of the group of light sources for each of the plurality of color components, wherein controlling the pulse widths comprises: determining whether the illumination value for each of the plurality of color components is smaller than a predetermined value; and narrowing the pulse width of a light pulse of a light source in the group of light sources that is determined to have an illumination value that is not smaller than the predetermined value if it is determined that an illumination value of another light source in the group of light sources is smaller than the predetermined value.

10. A method for a projector apparatus comprising a group of light sources configured to emit light beams of a plurality of color components, and a projection unit configured to project an image using the light beams from the group of light sources, the method comprising: driving the group of light sources so that the light beams are emitted as light pulses having respective pulse widths for a period in which the projection unit projects the image; controlling the pulse widths of the light pulses emitted from the group of light sources; and measuring illumination values of the group of light sources for each of the plurality of color components, wherein controlling the pulse widths comprises: determining whether the illumination value for each of the plurality of color components is smaller than a predetermined value; and narrowing the pulse width of a light pulse of a light source in the group of light sources that is determined to have an illumination value that is not smaller than the predetermined value if it is determined that an illumination value of another light source in the group of light sources is smaller than the predetermined value.

* * * * *